United States Patent [19]
Patel et al.

[11] Patent Number: 6,103,839
[45] Date of Patent: Aug. 15, 2000

[54] HORIZONTALLY FLOWING CONTINUOUS FREE RADICAL POLYMERIZATION PROCESS FOR MANUFACTURING WATER-SOLUBLE POLYMERS FROM MONOMERS IN AQUEOUS SOLUTION

[75] Inventors: Mayur Patel, Darien; Cheng-Sung Huang, Naperville; Robert W. Reese, Jr., Glenwood; Jeffrey R. Cramm, Batavia; Paul J. Harris, Orland Park, all of Ill.

[73] Assignee: Nalco Chemical Company, Naperville, Ill.

[21] Appl. No.: 09/075,684

[22] Filed: May 11, 1998

[51] Int. Cl.$^7$ .......................... C08F 220/06; C08F 220/56
[52] U.S. Cl. .............................. 526/65; 526/64; 526/240; 526/307.4; 526/307.6; 524/827; 524/831; 524/832
[58] Field of Search ................................ 526/64, 65, 240, 526/307.4, 307.6; 524/831, 832, 827

[56] References Cited

U.S. PATENT DOCUMENTS

| | | |
|---|---|---|
| 3,601,370 | 8/1971 | Ruettener et al. . |
| 3,732,193 | 5/1973 | Svarz . |
| 4,046,718 | 9/1977 | Mass . |
| 4,110,521 | 8/1978 | Barnett . |
| 4,138,539 | 2/1979 | Landolt et al. . |
| 4,143,222 | 3/1979 | Goretta . |
| 4,196,272 | 4/1980 | Goretta et al. . |
| 4,625,001 | 11/1986 | Tsubakimoto et al. . |
| 4,729,877 | 3/1988 | Hennig . |
| 4,769,427 | 9/1988 | Nowakowsky et al. . |
| 4,812,544 | 3/1989 | Sopko et al. . |
| 4,857,610 | 8/1989 | Chmelir et al. . |
| 4,893,999 | 1/1990 | Chmelir et al. . |

FOREIGN PATENT DOCUMENTS

| | | |
|---|---|---|
| 160394 | 6/1985 | European Pat. Off. . |
| 1380149 | 8/1975 | United Kingdom . |
| 2154596 | 11/1985 | United Kingdom . |

OTHER PUBLICATIONS

Advances in Polymer Technology, vol. 3, No. 2, pp. 99–105.
Advances in Polymer Technology, vol. 9, No. 4, pp. 321–330.
Advances in Polymer Technology, vol. 11, No. 4, pp. 287–294.
Polymer Process Engineering, 3 (1&2), 71–83 (1985).

*Primary Examiner*—David Buttner
*Attorney, Agent, or Firm*—Michael B. Martin; Thomas M. Breininger

[57] ABSTRACT

A continuous free radical polymerization process for the preparation of water-soluble copolymers from water-soluble monomers for further processing to dry polymers is disclosed. The process allows efficient polymerization of the monomers in aqueous solution in the presence of a free radical catalyst through backmixing. Water-soluble polymers with molecular weights of from about 3,000–30,000,000 and preferably from about 500,000–10,000,000 are obtained utilizing this process.

23 Claims, No Drawings

HORIZONTALLY FLOWING CONTINUOUS FREE RADICAL POLYMERIZATION PROCESS FOR MANUFACTURING WATER-SOLUBLE POLYMERS FROM MONOMERS IN AQUEOUS SOLUTION

FIELD OF THE INVENTION

A continuous free radical polymerization process for the preparation of water-soluble copolymers from water-soluble monomers for further processing to dry polymers is disclosed. The process allows efficient polymerization of monomers in aqueous solution in the presence of a free radical catalyst through backmixing. Water soluble polymers with molecular weights of from about 3,000–30,000,000 and preferably from about 500,000–10,000,000 are obtained utilizing this process.

BACKGROUND OF THE INVENTION

Water-soluble polymers have utility as additives in many industries, such as the pulp and paper industry, the petrochemical industry, and the mining industry among others. New and improved techniques for forming these polymers are always of interest.

A common method for polymerizing water-soluble unsaturated monomers is to polymerize aqueous solutions of monomers under appropriate reaction conditions. The aqueous solution polymerization of such monomers as acrylamide, and acrylic acid among others has certain disadvantages. The process is generally a batch-type process, which can produce only dilute polymer solutions. Moreover, the batch-type polymerization process forms a hydrous polymer. This hydrous polymer usually contains 60–80% of water and is in the form of an aqueous solution, but it is a rubber-like substance which has substantially no fluidity or a viscous liquid difficult to flow because the molecular weight of the polymer is very high. Accordingly, the hydrous polymer as such is difficult to handle and uneconomical in transportation, and also it has the disadvantage that the rate of dissolution of the polymer in water when using the hydrous polymer is very low. Therefore, the aforesaid hydrous polymer is usually formed into a dried powder by removing water therefrom by some methods, and one of the methods of removing water is a method of heat-drying the hydrous polymer as obtained with hot air for example. This method is often industrially used because it is simple in principle and has many advantages with respect to production. However, in general, the dissolvability of the dried polymer obtained in water tends to be decreased in accordance with certain factors such as an increase in the monomer concentration in the polymerization step, the molecular weight of the polymer and the drying temperature among others.

When the decrease in dissovability is slight, it can be compensated for by such a means as to prolong the dissolving time when the dried polymer is used. However, when the decrease is great, the polymer is only swollen even when stirred in water for a long time, and gives a solution containing many insoluble particles. Therefore, when said solution is used for treating waste water or the like as a flocculant only a low flocculating ability is shown, and when it is used as a thickener for paper-making, fish eyes are formed on the web formed.

However, it is often desirable that the monomer concentration in the polymerization and the drying temperature are high, in respect of productivity, and that the molecular weight of the polymer is high in respect of performance. In addition, the dissolvability of the polymer must be good. Therefore strenuous efforts have been made to adjust these requirements, and as one of the means for solving this problem, attempts have been made to develop substances which improve the dissolvability of the dried acrylamide polymer. Some of these substances are those like mild chain-transfer agents which prevent a polymer having too high a molecular weight from being produced, and others and substances having an effect of preventing cross-linking in the drying step.

If it were possible to produce concentrated polymers by a solution polymerization technique which was rapid and readily produced polymers in a solid, readily dissolvable form, an advance in the art would be afforded. Also of benefit would be a method for using solution polymerization techniques to continuously produce water-soluble vinyl polymers. It is therefore an object of this invention to provide a continuous process for polymerizing water soluble vinyl monomers. A further object is to provide a method for polymerizing water-soluble vinyl monomers which produce finished polymers in a concentrated form.

Most continuous processes involve moving reactant materials horizontally as polymerization takes place. Once reagents are initially introduced and polymerization begins, the reagents and product polymer proceed in a forward direction. For example, among the continuous processes for polymerization are a technique which utilizes an endless conveyor belt as disclosed in U.S. Pat. Nos. 4,138,539; 4,893,999; 3,732,193 and 4,857,610; formation of cross-linked polymer gels by a single screw cylindrical mixer in U.S. Pat. No. 4,769,427 and polymerization within a tubular reactor as disclosed in U.S. Pat. No. 4,196,272. By their nature and configuration, opportunity for mixing to ensure complete reaction of all reagents is reduced. Therefore, there is a need for an improved continuous process which leads to the production of a more highly concentrated product of higher quality, by allowing a more complete mixing.

One method by which such objects can be achieved is by a polymerization technique which involves a continuous polymerization process performed in an extruder which allows backmixing. Such extruders, or kneaders, as they are also referred to, have been utilized for the purposes of mixing, kneading and compounding. This piece of equipment is a long rod equipped with flanges enclosed within a housing which also has flanges in the interior. The long rod is rotated or moved back and forth within the housing. A feature of this housing is that there are various temperature zones along the length of it which may be independently controlled. Reactants are placed at one end of the housing, though they may be also added at other points further down the housing. As a certain temperature range is maintained, the reactants begin to polymerize as the flow through the interior of the housing. The interaction of the long rod or screw flanges with those of the interior of the housing effects a cleaning, insuring that polymeric product does not stick to the equipment, but rather continues to move within the housing to the opposite end. Such devices have been disclosed in U.S. Pat. No. 3,601,370 and GB 1,380,149.

Polymers have been produced within extruders, though the general trend has been to utilize a twin screw extruder. A review of the use of the twin screw extruder for polymerizations is disclosed in *Advances in Polymer Technology*, Vol. 9, No. 4, pp. 321–330; and in *Advances in Polymer Technology*, Vol. 3, No. 2, pp. 99–105, and particularly Table 3 of that reference which indicates that twin screw extruders have been utilized to do free radical polymerizations which produce water-soluble polymers. A free radical polymerization method for producing homopolymers and copolymers from amido-sulfonic acid or salt containing monomers in aqueous solution in the presence of high energy mechanical mixing (defined as an extruder, wherein twin screw extruders are preferred) to produce a solid polymer is disclosed in U.S. Pat. No. 4,812,544. Continuous production of crosslinked polymers by free radical polymerization of monomers in aqueous solution in a vessel having a plurality of mutually parallel rotary stirring shafts each fitted with stirring blades is disclosed in U.S. Pat. No. 4,625,001, and the polymerization of methylmethacrylate in a counter-rotating twin screw extruder is disclosed in *Polymer Process Engineering,* 3 (1&2), 71–83 (1985).

Polymerizations have also been effected in single screw extruders. A process for the continuous manufacture of silicone gums form cyclopolysiloxane monomers in a single screw-kneader reactor is disclosed in GB 2,154,596. A continuous free radical polymerization of vinylic compounds such as acrylamide and acrylic acid in a wiped surface reactor is disclosed in EP 160,394. This reference discloses that vinylic compounds may be diluted by organic solvents or added neat, and specifies that the polymerization is performed such that the reactants are substantially free of oxygen, preferably in a twin screw reactor. Monomers in aqueous solution are not disclosed.

That the use of an extruder allows for enhanced mixing capabilities has been recognized. GB 1,380,149 discloses an extruder with a reciprocating mechanism which is useful for performing chemical reactions. That the mixing mechanism of an extruder comprises distributive and dispersive longitudinal mixing, during reactive extrusion is disclosed *Practical Aspects of Reactive Compounding in a Continuous Kneader, Advances in Polymer Technology*, Vol 11, No. 4, pp. 287–294 (1992), and in *Influence of Polymer Flow Behavior on Reactive Process in Rotating-Oscillating Kneaders*, presented at the SPI National Plastics Exposition Conference in 1988. Backmixing is mentioned in *Reactive Extrusion of Polymers: A Review, Advances in Polymer Technology*, Vol. 9, No. 4, pp. 321–330 (1989) on p. 323 as influential to residence time distribution and molecular weight distribution of polymers obtainable by free radical reaction. However, these references do not recognize that backmixing is desirable in a free radical polymerization for the more efficient production of polymers.

Backmixing has the advantage of compensating for any fluctuations in the feed systems, containing two or more independant feed streams to the reactor. This is a very important feature when the feed stream ratio is greater than 1:1. To illustrate, in Example 2 which follows, the monomer to initiator feed ratio is 80:1. Without backmixing, a plug flow situation can arise and may potentially lead to a product of inconsistent quality.

Therefore, there is still a need for a highly efficient method to continuously produce a water-soluble copolymer from monomers such as acrylamide and acrylic acid in aqueous solution by free radical reaction, which polymerization method provides good mixing, transport and control over molecular weight distribution and temperature. In a water-soluble polymerization, the ability to use a more concentrated monomer solution would be advantageous for production of dry polymers because this means that there would be less need for water which must later be removed from the polymer produced. This invention allows the use of more concentrated aqueous monomer solutions in continuous polymerization by use of a single screw reactor.

Additional advantages of the use of a single screw reactor for polymerization include: ability to add other reactants such as chain transfer agents or pH buffers at later stages of the polymerization due to the fact that for each zone of the reactor there are inlets which allow for such addition; no requirement for pre-polymerization; ability to obtain higher molecular weights, since the reaction may be run at relatively low temperature in the first and second zones, and controlled to a higher temperature at subsequent zones; and a higher free reactor volume which allows for higher residence times and the preparation of very high molecular weight solution polymers at economically feasible production rates than with conventional twin screw reactors.

SUMMARY OF THE INVENTION

A continuous free radical polymerization process for the preparation of water-soluble copolymers from water-soluble monomers for further processing to dry polymers is disclosed. The process allows efficient polymerization of monomers in aqueous solution in the presence of a free radical catalyst through backmixing. Water-soluble polymers with molecular weights of from about 3,000–30,000,000 and preferably from about 500,000–10,000,000 are obtained utilizing this process.

DESCRIPTION OF THE INVENTION

One aspect of the invention is a method for increasing the efficiency of polymerization during continuous production of high molecular weight water-soluble polymers comprising the steps of:

a) preparing an aqueous solution of one or more water-soluble monomers having a concentration of from about 5 to about 80 percent by weight;

b) continuously feeding said solution to a horizontally-aligned reactor having an interior cavity, an exterior housing, an inlet end, and outlet end and a conveying and mixing device within said interior cavity;

c) mixing and backmixing said solution as it is conveyed from said inlet end to said outlet end through said interior cavity of said reactor by said device under free radical polymerization conditions; and, d) continuously withdrawing a polymeric solution from said outlet end of said reactor.

Another aspect of the invention is a process for the efficient continuous synthesis of a high molecular weight dry polymer comprising the steps of:

a) preparing an aqueous solution of one or more water-soluble monomers having a concentration of from about 5 to about 80 percent by weight;

b) continuously feeding said solution to the inlet end of a wiped surface reciprocating single screw reactor having an inlet end, an outlet end, an interior cavity, an exterior housing, a conveying and mixing device within said interior cavity and a plurality of zones along said exterior housing wherein temperature can be separately regulated within each zone;

c) mixing and backmixing said solution as it is conveyed from said inlet end to said outlet end through said interior cavity of said reactor by said device under free radical polymerization conditions;

d) continuously withdrawing a polymeric solution from said outlet end of said reactor; and, e) drying said polymeric solution.

Yet another aspect of the invention is a horizontal continuous process for manufacture of water-soluble polymers comprising the steps of:

a) preparing an aqueous solution of one or more water-soluble monomers having a concentration of from about 5 to about 80 percent by weight;

b) continuously feeding said solution to a horizontally-aligned reactor having an interior cavity, an exterior housing, an inlet end, an outlet end and a conveying and mixing device within said interior cavity;

c) mixing said solution as it is conveyed from said inlet end to said outlet end through said interior cavity of said reactor by said device under free radical polymerization conditions; and, d) continuously withdrawing a polymeric solution from said outlet end of said reactor.

The following information may be applied to any aspect of the invention. Monomers may be selected from the group consisting of acrylic acid and salts thereof, methacrylic acid and salts thereof, methyl acrylate, ethyl acrylate, acrylamide, methacrylamide, acrylonitrile, methacrylonitrile, vinyl pyridine, methacrylonitrile, vinyl acetate, hydroxyethylacrylate, hydroxyethylmethacrylate, hydroxypropylacrylate, hydroxypropylmethacrylate, N-vinylpyrrolidone, vinylsulfonic acid and salts thereof, acrylamidomethylpropanesulfonic acid and salts thereof, maleic anhydride, maleic acid, fumaric acid, itaconic acid, diallyldimethyl ammonium chloride, dimethylaminoethyl acrylate and salts thereof, dimethylaminoethylacrylate and salts thereof, dimethylaminoethyl acrylate methyl chloride quaternary salt, dimethylaminoethyl methacrylate methyl chloride quaternary salt, dimethylaminoethyl acrylate benzyl chloride quaternary salt, dimethylaminoethyl methacrylate benzyl chloride quaternary salt, diemthylaminopropylacrylamide and salts thereof, dimethylaminopropylmethacrylamide and salts thereof, acrylamidopropyltrimethyl ammonium chloride, vinyl pyridine and salts thereof and combinations thereof. The polymeric solution may be a copolymer formed from monomers acrylamide and sodium acrylate. The amount of said monomer solution may be from about 30 to about 50 percent by weight based upon the total weight of said monomer and said solution. The exterior of said reactor may have a plurality of zones, each of said zones having addition portals and a temperature regulation jacket.

The process may further comprise the addition of reactants subsequent to the start of polymerization, in addition to the continuous feeding of step b) through one of said portals of said zones wherein said reactants are selected from the group consisting of monomers, initiators, chain transfer agents, buffers, diluents, starch, derivatizing agents, foaming agents and cross-linking agents.

The process may further comprising a post-treatment of the polymer selected from the group consisting of drying, pelletizing, seiving and size reduction. A useful reactor for the practice of this invention may have five zones; the first zone maintained at a temperature within the range of from about 60 to about 90° F., the second zone maintained at a temperature within the range of from about 100 to about 120° F., the third zone maintained at a temperature within the range of from about 140 to about 160° F., the fourth zone maintained at a temperature within the range of from about 180 to about 200° F. and the fifth zone maintained at a temperature within the range of from about 190 to about 210° F. Any of the processes may further comprise the addition of reactants subsequent to the start of polymerization through one of said zones wherein said reactants are selected from the group consisting of monomers, chain transfer agents, buffers, starches, diluents, foaming agents, derivatizing agents and cross-linking agents. Derivatizing agents could be added to the reactor to modify the polymer by reaction at an appropriate side chain.

There are various ways to achieve the necessary backmixing to produce a consistent product quality. Applicable methods can be developed by modification of screw elements and shaft designs within the reactor. More specifically, either a single screw shaft can be used with a reciprocating motion or two screw shafts with opposing orientations may be utilized to obtain the advantageous backmixing.

The Monomers

The process according to the present invention firstly relates to the polymerization of monomers to produce homopolymers or copolymers. Water-soluble monomers useful for the practice of this invention include acrylic acid and methacrylic acid (and salts thereof with sodium acrylate as a preferred salt), acrylamide and its derivatives, methacrylonitrile and acrylonitrile, vinyl pyridine, and vinyl acetate ethyl acrylate, methyl acrylate; other water-soluble monomers such as polymerizable acids and their salts, in particular, maleic, fumaric, itaconic, vinylsulfonic or acrylamidopropane sulfonic acids; and the esters of polymerizable acids containing hydroxy groups, in particular, the hydroxyethyl and hydroxypropyl esters of acrylic and methacrylic acids. In addition, esters and amides of polymerizable acids containing amino groups and ammonium groups, such as dialkylaminoesters, in particular the dimethyl and diethylaminoalkylesters of acrylic and methacrylic acids, as well as the trimethyl-and triethylammoniumalkyl esters and the corresponding amides may be used. The foregoing monomers can polymerize alone to form homopolymers or together to form copolymers.

Monomers can be added to the reactor in a concentration of from about 30% or higher to the solubility limit. As the concentration of monomer increases, polymer molecular weight increases, polymerization rate increases and drying energy requirements decrease. This benefit is not available in conventional continuous polymerization techniques, such as belt polymerizations which require lower concentrations of monomers due to the exothermic nature of the polymerization. Moreover, belt polymerization cannot be run at high pressures. Problems associated with the exothermic nature of the polymerization can be avoided by the utilization of a single screw reactor having zones, wherein said zones allow for regulation of temperature and handle reaction pressure during the course of the polymerization.

To facilitate addition of concentrated monomers in aqueous solution, the following system for continuous feeding of the monomers may be utilized in conjunction with the single screw reactor. A monomer solution consisting of sodium acrylate and acrylamide may be continuously manufactured using a computer control system to feed all raw materials. The neutralization of the monomer solution is accomplished by a two step pH control system to add 50 weight percent of sodium hydroxide (caustic) solution. Acrylamide, deionized water and acrylic acid are continuously metered into this continuous system. The solution of the mixture is cooled with an in-line heat exchanger to from about 40° F. to about 70° F. After the solution is cooled, the first step uses 95% percent of the total caustic solution required for neutralization to achieve pH of 6.2. After the 95% caustic charge into the mixture, some residence time is provided to allow the solution to mix at a high temperature of approximately 125° F. This solution is again cooled to allow the second step to proceed. The second step uses the remaining 5% of caustic solution to complete the neutralization and to achieve the desired final pH.

The Initiators

Free radical yielding initiators are used in the polymerization process. Both organic and inorganic type compounds are acceptable for the practice of this polymerization method. Azo-type compounds such as 2,2'-azobis (isobutyronitrile) are used advantageously. Water soluble Azo compounds are preferred including 4,4'-azobis (4-cyanopentanoic acid); 2,2'-azobis (N,N'-dimethylene isobutyramidine) dihydrochloride; 2,2'-azobis (2-amidinopropane) dihydrochloride and 2,2'-azobis [2-methyl-N-(2-hydroxyethyl) propionamide] among others, in amounts between 0.0001 and 0.5 percent by weight of monomer. Initiators such as potassium persulfate and peroxides such as t-butyl hydroperoxide are used as well as redox systems, the most preferred being t-butylhydroperoxide and sodium bisulfite. Moreover, combinations of azo and redox initiator systems allow polymerization over a broad temperature range. Generally, the amounts of these free radical initiators range between 0.0001 and 0.5 percent by weight of monomer.

The Reactor

A single screw reactor that provides self-cleaning and high free volume capabilities is highly desirable. One such useful single screw extruder is the Buss Kneader, available from BussAmerica, which has a reciprocating motion which provides excellent self-cleaning and conveyance.

The Buss Cokneader is a single-screw kneader reactor with interrupted flights. Pins from the barrel project into the screw channel. The screw is both rotating and oscillating. Due to this action, screw flights are continuously wiped by the pins. During one passage of the pin, the material is not only subjected to high shear stress, but is reoriented as well, thus promoting the distributive mixing process by the local weaving action of the pins and screw flights. The reactor contains a series of zones along its length, each of which allows for independant temperature control and addition of reactants.

The following details provide a general guideline to one suitable type of reactor which might be utilized for small scale polymer synthesis. For larger scale production, a larger reactor would be utilized. The monomer (182 gm/min) and initiator (2.28 gm/min) are fed to a single screw reactor with a split barrel, having a 100 mm diameter with a length of 19 D and a processing volume of 2.318 gallons.

Residence time necessary for 99.95% conversion was obtained by controlling the total feed rate of 25 lb/hr and screw speed of 40 rpm. The reactor was advantageously fitted with means for providing an inert atmosphere to the solution undergoing polymerization.

Depending upon the reaction kinetics and thoroughput desired, the reactor may be as short as one foot and as long as 28 feet or more. Likewise, diameter of the reactor can vary greatly depending upon throughput, reaction rate and screw speed. The type of screw elements and speed may also greatly vary depending upon the desired residence time for the solution of vinyl monomers. The screw elements should also be designed and rotation accomplished to allow monomer solution and initiator to react at the feed section of the reactor and discharge at the end of the screw reactor. The reactor may be fitted with a heating and/or cooling jacket on the exterior so as to provide heating or cooling capability and thus provide a means for regulating polymerization reactions taking place within the reactor. Cooling may be desirable for an exothermic polymerization reaction and for low initiation temperature to achieve a high molecular weight polymer. Heating may be desirable to control or increase the rate of polymerization within the reactor.

The reactor will be aligned horizontally, such that reagents are axially conveyed by the mixing device. As used herein, the term horizontal means substantially horizontal, inclusive of a horizontal reactor set at angle of up to and including about 25°.

The Polymerization

During polymerization, the various monomers or comonomers are adjusted to suitable polymerization temperature. Inasmuch as the polymerization reaction is exothermic, the reaction itself will contribute to the temperature increase and reactor jacket control system in each of the zones allows the polymerization to acquire suitable temperature profile. The rate of temperature increase is generally critical for the production of completely soluble high molecular weight polymers and the various monomers and additives can be initially cooled to help control reaction temperatures. In a single screw reactor, various zones can be controlled to produce a suitable polymerization reaction temperature profile as well as a final polymerization reaction temperature.

For example, if a five process zone reactor is utilized, the first process zone can be controlled to a temperature of approximately 34° F. to 100° F., the second zone, a temperature of about 80° F. to about 150° F. with the third zone being controlled to a temperature of from 100–200° F., fourth zone at 150–210° F. and fifth zone at 150–300° F. High 4th and 5th zone temperatures are important to achieve 99.9% conversion. It is to be understood however that many other types of temperature control or arrangements via a single screw reactor can be utilized. To achieve the necessary molecular weight, polymerization will generally be completed within 10 to 45 minutes. To further increase efficiency, an attachment such as a cone or a pipe may be added to the end of the reactor to increase reactor fill level and extend residence time. The cone would be attached to the outlet end of the reactor, to increase the fill level in the screw reactor and to provide additional residence time of 5.5 min. The cone was 2.87 inches in diameter with 5.5 inches in straight length, and tapered to 0.88 inches at the outlet with 9.5 inches in length. With the cone attachment, an additional 2.52 gallon volume is added to the reactor. The resultant polymer generally has a moisture content of from about 45% to about 65%.

Post-Polymerization Treatment

Another aspect of the present invention is production of solid homo- or copolymer by removal of the solvent, water. In addition to conducting the final or terminal polymerization step at a high temperature, one can cool the resultant homo- or copolymer. That is, the temperature of the homo- or copolymer is reduced below ambient temperature and preferably is maintained at a temperature of at least 70° F. and more generally at least 50° F. before it is subjected to drying. The reason for cooling the polymer is to allow ease of pelletization. The pelletized polymer is sprayed with PEG or oil to minimize agglomeration. The polymer is conveyed to a dryer and dried at conditions not exceeding 270° F., since beyond 270° F. the polymer degrades. Drying can also be achieved by applying a vacuum, without heat or with heat at temperatures of from ambient to those set forth above. Drying is continued until most of the solvent is removed. Desirably, the amount of solvent such as water remaining in the solid polymer is 20% or less, more desirably 10%. A dried product is very desirable because of commercial reasons such as ease of size reduction, ease of handling, and inventory advantages among others. The size reduction and the particle size distribution is critical to the dissolution rate of the polymer. Optimum particle size distribution is 0–25% on +20 mesh and 0–5% through 100 mesh.

Polymers and copolymers produced according to the present invention are useful in many applications, since the resultant high molecular weight polymers are useful as flocculants. For example, the polymers so produced may be used in water treatment for industrial processes, municipal sludge, mining, and pulp and paper among others. Polymers produced according to this process are highly water soluble, and have a very low content of insoluble gel.

The following examples are presented to describe preferred embodiments and utilities of the invention and are not meant to limit the invention unless otherwise stated in the claims appended hereto.

EXAMPLE 1

The process involves a solution polymerization carried out continuously in a screw reactor to produce a high molecular weight anionic 30 mole % charged sodium acrylate/acrylamide copolymer in a form of water-swelled polymer gel with a rubbery consistency, containing approximately 50 to 70% water. This "wet gel" is most appropriately termed a solution, and is further processed to remove most of the water by sequential operations including wet grinding, drying, grinding and classifying. The final product is a dry, free-flowing granular with a 20–100 mesh (75–850 micron) particle size. The screw reactor can also be utilized to remove most of the water using the venting chamber in combination with a vacuum system to produce a final dry product with a moisture content ranging from 8 to 20%.

Monomer solution consisting of sodium acrylate and acrylamide is continuously fed to a stripper tank containing an agitator and a nitrogen purge system (see attached flow diagram). In the stripper, dissolved oxygen in the solution is reduced from 8000 ppb to approximately 10 ppb. Extreme measures are taken to ensure that oxygen is eliminated because the polymerization reaction is highly sensitive to oxygen which can adversely affect the polymerization kinetics, and hence, the final polymer properties (molecular weight, residual monomers, insolubles).

Prior to feeding the monomer solution from the stripper to the screw reactor, various additives are mixed in-line with the monomer solution. The first additive mixed in-line is a mixture of Versenex-80 (chelating agent), sodium formate (chain transfer agent) and an Azo compound (high temperature initiator). Sufficient in-line residence time is allowed for the chelating process, i.e., chelating agent to inactivate the copper sulfate inhibitor in the acrylamide monomer. Second additive mixed in-line is t-Butyl Hydroperoxide (oxidant component of the redox initiator system). The third additive is a mixture of ferrous ammonium sulfate and sodium bisulfite (reductant components of the redox initiator system) mixed in-line or fed separately to the screw reactor. The final polymer properties are highly dependent on both the type and amounts of the initiators used in the polymerization. It is, therefore, imperative that the monomer solution and all the additive feed levels are accurate and precisely controlled.

Just prior to entering the screw reactor, the monomer solution with additives are pre-cooled to 5–8° C. The pre-cooled solution is fed to the front end of the screw reactor, preferably the Buss Cokneader available from Buss America, Inc. The Buss Cokneader is a single-screw kneader reactor with interrupted flights. Pins from the barrel project into the screw channel. The screw is both rotating and oscillating. Due to this action, screw flights are continuously wiped by the pins. During one passage of the pin, the material is not only subjected to high shear stress, but is reoriented as well, thus promoting the distributive mixing process by the local weaving action of the pins and screw flights.

In the screw reactor, one or two solutions are intimately intermixed to start the reaction. Five screw reactor zones with jackets are used for controlling the process reaction. All five zones are temperature controlled with water to produce suitable polymerization reaction temperatures throughout the screw reactor. The in-process temperatures range from 34° F. to 300° F. Additionally, at spaced intervals, a venting chamber is provided to conveniently remove water vapor, if necessary, from the fully polymerized "wet gel." With approximately 20 minutes residence time, in the screw reactor, depending upon the feed rate, screw configuration and screw speed, the polymerization reaction is completed and the solid polymer is forced out of the discharge end of the screw reactor as a continuous stream of polymer solid. Moisture content of the polymer produced depends on the initial monomer concentration and can range from 45% to 65%. With use of the venting chambers, the moisture content of the polymer can be further reduced in the range of 8–20%. The solid material from the screw reactor is then further processed using a wet grinder, dryer, dry grinder and a classifier to produce a dry free-flowing granular with a 20–100 mesh (75–850 micron) particle size product.

EXAMPLE 2

A polymerization was performed in the single screw reactor under the following conditions. A continuous or a batch system was used to prepare the monomer solution, as follows. A monomer solution was charged with 76.5 lbs of deionized (DI) water and 211.92 lbs of acrylamide (50% active). The solution was mixed and cooled to about 64–72° F. When temperature reached about 64–72° F., the cooling was stopped. 46.04 lbs of acrylic acid was next charged to the solution and mixed, followed by 51.11 lbs of sodium hydroxide (50% active) while maintaining temperature between 68–77° F. and pH to 7–7.5 at 77° F. pH was adjusted with caustic when necessary. The solution was further cooled to 43° F., using chilled water.

Three initiator solutions, referred here as A, B and C were prepared as follows:

For Initiator A, 8.8 lbs of DI water, 0.2056 lbs of caustic and 0.0056 lbs of sodium hypophosphite were all changed to a hold tank 'A'. The solution was nitrogen purged for 20 minutes. 0.4 lbs of 501 was then mixed in, until fully dissolved. Then 0.188 lbs of Versenex 80 was charged to the hold tank. For Initiator B, 12% actives tertiary butyl hydroperoxide (TBHP) was prepared using a 70% solution. 9.6 lbs of DI water was charged to hold tank B and nitrogen purged for 20 minutes, followed by 0.0266 lbs of 12% active TBHP solution and further nitrogen purging.

For Initiator C, 9.6 lbs of DI water and 0.0016 lbs of sulfuric acid was added to hold tank C. Sulfuric acid charge was adjusted to achieve pH of 3. The solution was purged for 20 minutes. 0.016 lbs of sodium bisulfite and 0.0144 lbs of ferrous ammonium sulfate were added to hold tank C. All initiator solutions are constantly nitrogen purged such that oxygen levels are below 20 ppb.

The monomer solution was continuously purged in a stripper tank such that oxygen level in the solution was reduced from 8 ppm to 20 ppb. The flow rate of the monomer solution to the screw reactor was maintained at 0.402 lbs/min. Initiator solution A, B and C flow rates were maintained at 2.27 gm/min.

The monomer solution and initiators described above were fed to the screw reactor. The five zone single screw reactor temperatures were held at 77° F., 110, 150, 195 and 205° F. The product produced was a 30/70 mole ratio acrylate/acrylamide copolymer with 52% moisture and 0.01% insolubles. This resultant polymer, in the form of a "wet gel" was dried to a product containing 8–14% moisture, and RSV of 30 dl/g at 0.045% in 1.0 M sodium nitrate.

EXAMPLE 3

Water-soluble polymer may also be obtained in a continuous process which utilizes a twin screw reactor in the following manner. The monomer and initiator are fed to a non-intermeshing counter-rotating twin screw reactor, with a 30 mm diameter and a length of 76 D and processing volume of 0.3 gallons. The residence time necessary for 99.9% conversion was controlled with a feed rate of 20 lb/hr and screw speed of 90 rpm. Products similar to those described above were obtained.

Changes can be made in the composition, operation and arrangement of the method of the present invention described herein without departing from the concept and scope of the invention as defined in the following claims.

What is claimed is:

1. A multi-directionally flowing horizontal continuous process for aqueous free radical polymerization of water-soluble monomers to form a water-soluble polymer comprising the steps of:
   a) continuously feeding an aqueous solution of one or more water-soluble monomers having a concentration of from about 5 to about 80 percent by weight to a horizontally-aligned reactor having an interior cavity, an exterior housing, an inlet end, an outlet end and a conveying and mixing device within said interior cavity;
   b) mixing and backmixing said solution as it is conveyed from said inlet end to said outlet end through said interior cavity of said reactor by said device under free radical polymerization conditions; and,
   c) continuously withdrawing the water-soluble polymer from said outlet end of said reactor.

2. The process of claim 1 wherein said monomers are selected from the group consisting of acrylic acid and salts thereof, methacrylic acid and salts thereof, methyl acrylate, ethyl acrylate, acrylamide, methacrylamide, acrylonitrile, methacrylonitrile, vinyl pyridine, methacrylonitrile, vinyl acetate, hydroxyethylacrylate, hydroxyethylmethacrylate, hydroxypropylacrylate, hydroxypropylmethacrylate, N-vinylpyrrolidone, vinylsulfonic acid and salts thereof, acrylamidomethylpropanesulfonic acid and salts thereof, maleic anhydride, maleic acid, fumaric acid, itaconic acid, diallyldimethyl ammonium chloride, dimethylaminoethyl acrylate and salts thereof, dimethylaminoethylacrylate and salts thereof, dimethylaminoethyl acrylate methyl chloride quaternary salt, dimethylaminoethyl methacrylate methyl chloride quaternary salt, dimethylaminoethyl acrylate benzyl chloride quaternary salt, dimethylaminoethyl methacrylate benzyl chloride quaternary salt, diemthylaminopropylacrylamide and salts thereof, dimethylaminopropylmethacrylamide and salts thereof, acrylamidopropyltrimethyl ammonium chloride, vinyl pyridine and salts thereof and combinations thereof.

3. The process of claim 2 wherein said polymeric solution is a copolymer formed from monomers acrylamide and sodium acrylate.

4. The process of claim 1 wherein the amount of said monomer in solution is from about 30 to about 50 percent by weight based upon the total weight of said monomer and said solution.

5. The process of claim 1 wherein said exterior of said reactor has a plurality of zones, each of said zones having addition portals and a temperature regulation jacket.

6. The process of claim 5 further comprising the addition of reactants subsequent to the start of polymerization, in addition to the continuous feeding of step b) through one of said portals of said zones wherein said reactants are selected from the group consisting of monomers, initiators, chain transfer agents, buffers, diluents, starch, derivatizing agents, foaming agents and cross-linking agents.

7. The method of claim 5 wherein said reactor contains 5 zones wherein the temperature of the first zone is from about 34° F. to about 100° F., the temperature of the second zone is from about 80° F. to about 150° F., the temperature of the third zones is from about 100° F. to about 200° F., the temperature of the fourth zones is is from about 150° F. to about 210° F. and the temperature of the fifth zone is is from about 150° F. to about 300° F.

8. A horizontal continuous process for manufacture of water-soluble polymers comprising the steps of:
   a) continuously feeding an aqueous solution of one or more water-soluble monomers having a concentration of from about 5 to about 80 percent by weight to a horizontally-aligned reactor having an interior cavity, an exterior housing, an inlet end, an outlet end and a conveying and mixing device within said interior cavity;
   b) mixing said solution as it is conveyed from said inlet end to said outlet end through said interior cavity of said reactor by said device under free radical polymerization conditions; and,
   c) continuously withdrawing the water-soluble polymer from said outlet end of said reactor.

9. The process of claim 8 wherein said monomers are selected from the group consisting of acrylic acid and salts thereof, methacrylic acid and salts thereof, methyl acrylate, ethyl acrylate, acrylamide, methacrylamide, acrylonitrile, methacrylonitrile, vinyl pyridine, methacrylonitrile, vinyl acetate, hydroxyethylacrylate, hydroxyethylmethacrylate, hydroxypropylacrylate, hydroxypropylmethacrylate, N-vinylpyrrolidone, vinylsulfonic acid and salts thereof, acrylamidomethylpropanesulfonic acid and salts thereof, maleic anhydride, maleic acid, fumaric acid, itaconic acid, diallyldimethyl ammonium chloride, dimethylaminoethyl acrylate and salts thereof, dimethylaminoethylacrylate and salts thereof, dimethylaminoethyl acrylate methyl chloride quaternary salt, dimethylaminoethyl methacrylate methyl chloride quaternary salt, dimethylaminoethyl acrylate benzyl chloride quaternary salt, dimethylaminoethyl methacrylate benzyl chloride quaternary salt, diemthylaminopropylacrylamide and salts thereof, dimethylaminopropylmethacrylamide and salts thereof, acrylamidopropyltrimethyl ammonium chloride, vinyl pyridine and salts thereof and combinations thereof.

10. The process of claim 9 wherein said polymeric solution is a copolymer formed from monomers acrylamide and sodium acrylate.

11. The process of claim 8 wherein the amount of said monomer in solution is from about 30 to about 50 percent by weight based upon the total weight of said monomer and said solution.

12. The process of claim 8 wherein said exterior of said reactor has a plurality of zones, each of said zones having addition portals and a temperature regulation jacket.

13. The process of claim 12 further comprising the addition of reactants subsequent to the start of polymerization, in addition to the continuous feeding of step b) through one of said portals of said zones wherein said reactants are selected from the group consisting of monomers, initiators, chain transfer agents, buffers, diluents, starch, derivatizing agents, foaming agents and cross-linking agents.

14. A process for the efficient continuous synthesis of a high molecular weight water-soluble dry polymer comprising the steps of:
 a) continuously feeding an aqueous solution of one or more water-soluble monomers having a concentration of from about 5 to about 80 percent by weight to the inlet end of a wiped surface reciprocating single screw reactor having an inlet end, an outlet end, an interior cavity, an exterior housing, a conveying and mixing device within said interior cavity and a plurality of zones along said exterior housing wherein temperature can be separately regulated within each zone;
 b) mixing and backmixing said solution as it is conveyed from said inlet end to said outlet end through said interior cavity of said reactor by said device under free radical polymerization conditions;
 c) continuously withdrawing the resulting polymeric solution from said outlet end of said reactor; and,
 d) drying said polymeric solution.

15. The process of claim 14 wherein said monomers are selected from the group consisting of acrylic acid and salts thereof, methacrylic acid and salts thereof, methyl acrylate, ethyl acrylate, acrylamide, methacrylamide, acrylonitrile, methacrylonitrile, vinyl pyridine, methacrylonitrile, vinyl acetate, hydroxyethylacrylate, hydroxyethylmethacrylate, hydroxypropylacrylate, hydroxypropylmethacrylate, N-vinylpyrrolidone, vinylsulfonic acid and salts thereof, acrylamidomethylpropanesulfonic acid and salts thereof, maleic anhydride, maleic acid, fumaric acid, itaconic acid, diallyldimethyl ammonium chloride, dimethylaminoethyl acrylate and salts thereof, dimethylaminoethylacrylate and salts thereof, dimethylaminoethyl acrylate methyl chloride quaternary salt, dimethylaminoethyl methacrylate methyl chloride quaternary salt, dimethylaminoethyl acrylate benzyl chloride quaternary salt, dimethylaminoethyl methacrylate benzyl chloride quaternary salt, diemthylaminopropylacrylamide and salts thereof, dimethylaminopropylmethacrylamide and salts thereof, acrylamidopropyltrimethyl ammonium chloride, vinyl pyridine and salts thereof and combinations thereof.

16. The process of claim 15 wherein said dry polymer is a copolymer formed from monomers acrylamide and sodium acrylate.

17. The process of claim 14 wherein the amount of said monomer in solution is from about 30 to about 50 percent by weight based on the total weight of said monomer and said solution.

18. The process of claim 14 further comprising a post-treatment of said dry polymer selected from the group consisting of pelletizing, seiving and size reduction.

19. The process of claim 14 wherein each of said zones has addition portals and a temperature regulation jacket.

20. The process of claim 19 further comprising the addition of reactants subsequent to the start of polymerization, in addition to the continuous feeding of step b) through one of said portals of said zones wherein said reactants are selected from the group consisting of monomers, initiators, chain transfer agents, buffers, diluents, starch, foaming agents, derivatizing agents and cross-linking agents.

21. The process of claim 14 wherein a cone is attached to said outlet end of said reactor to increase residence time.

22. The process of claim 14 wherein said high molecular weight dry polymer is in the molecular weight range of from about 500,000 to about 10,000,000.

23. A multi-directionally flowing horizontal continuous process for aqueous free radical polymerization of sodium acrylate and acrylamide monomers to form a water-soluble acryate/acrylamide copolymer comprising the steps of:
 a) continuously feeding an aqueous solution of sodium acrylate and acrylamide monomers and one or more aqueous free radical initiator solutions to a horizontally-aligned reactor having an interior cavity, an exterior housing, an inlet end, an outlet end and a conveying and mixing device within said interior cavity and wherein said reactor contains five zones wherein the temperature of the first zone is from about 34° F. to about 100° F., the temperature of the second zone is from about 80° F. to about 150° F., the temperature of the third zone is from about 100° F. to about 200° F., the temperature of the fourth zone is from about 150° F. to about 210° F. and the temperature of the fifth zone is from about 150° F. to about 300° F.;
 b) mixing and backmixing said solution as it is conveyed from said inlet end to said outlet end through said interior cavity of said reactor by said device under free radical polymerization conditions; and,
 c) continuously withdrawing the acryate/acrylamide copolymer from said outlet end of said reactor.

* * * * *